United States Patent [19]

Mezger

[11] 4,394,812
[45] Jul. 26, 1983

[54] SUPERCHARGED INTERNAL COMBUSTION ENGINE FOR MOTOR VEHICLES

[75] Inventor: Hans Mezger, Freiberg, Fed. Rep. of Germany

[73] Assignee: Dr. Ing. h.c.F. Porsche Aktiengesellschaft, Stuttgart, Fed. Rep. of Germany

[21] Appl. No.: 246,587

[22] Filed: Mar. 23, 1981

[30] Foreign Application Priority Data

Mar. 22, 1980 [DE] Fed. Rep. of Germany ....... 3011203

[51] Int. Cl.³ ............................................ F02B 37/12
[52] U.S. Cl. .................................................... 60/600
[58] Field of Search ........................... 60/600, 601, 64; 123/564

[56] References Cited

U.S. PATENT DOCUMENTS

| | | | |
|---|---|---|---|
| 2,383,979 | 9/1945 | Lysholm | 60/601 |
| 2,645,409 | 7/1953 | Lawler | 60/600 X |
| 4,202,176 | 5/1980 | Mezger | 60/600 |
| 4,227,372 | 10/1980 | Kakimoto et al. | 60/611 X |

FOREIGN PATENT DOCUMENTS 2441804  3/1976  Fed. Rep. of Germany ........ 60/611

*Primary Examiner*—Michael Koczo
*Attorney, Agent, or Firm*—Craig & Burns

[57] ABSTRACT

A supercharged internal combustion engine of the type having an exhaust gas turbine driven supercharging blower, exhaust gas bypass for regulating the exhaust gas turbine by diverting exhaust gases around the turbine, and a blow-off valve control charging air bypass for circulating charging air supplied from the blower therearound when an engine performance control member such as a throttle is closed, is improved by provision of a second charging air bypass for circulating a portion of the air supplied by the blower therearound in response to at least one operating parameter of the engine in a manner so as to provide protection against excess charging pressure. The at least one operating parameter for controlling the second bypass includes engine rpm and/or charge pressure and opening of the second bypass may be regulated by a solenoid valve controlled by a safety switch responsive to charging air pressure or an rpm transducer such as an ignition pulse transducer.

5 Claims, 1 Drawing Figure

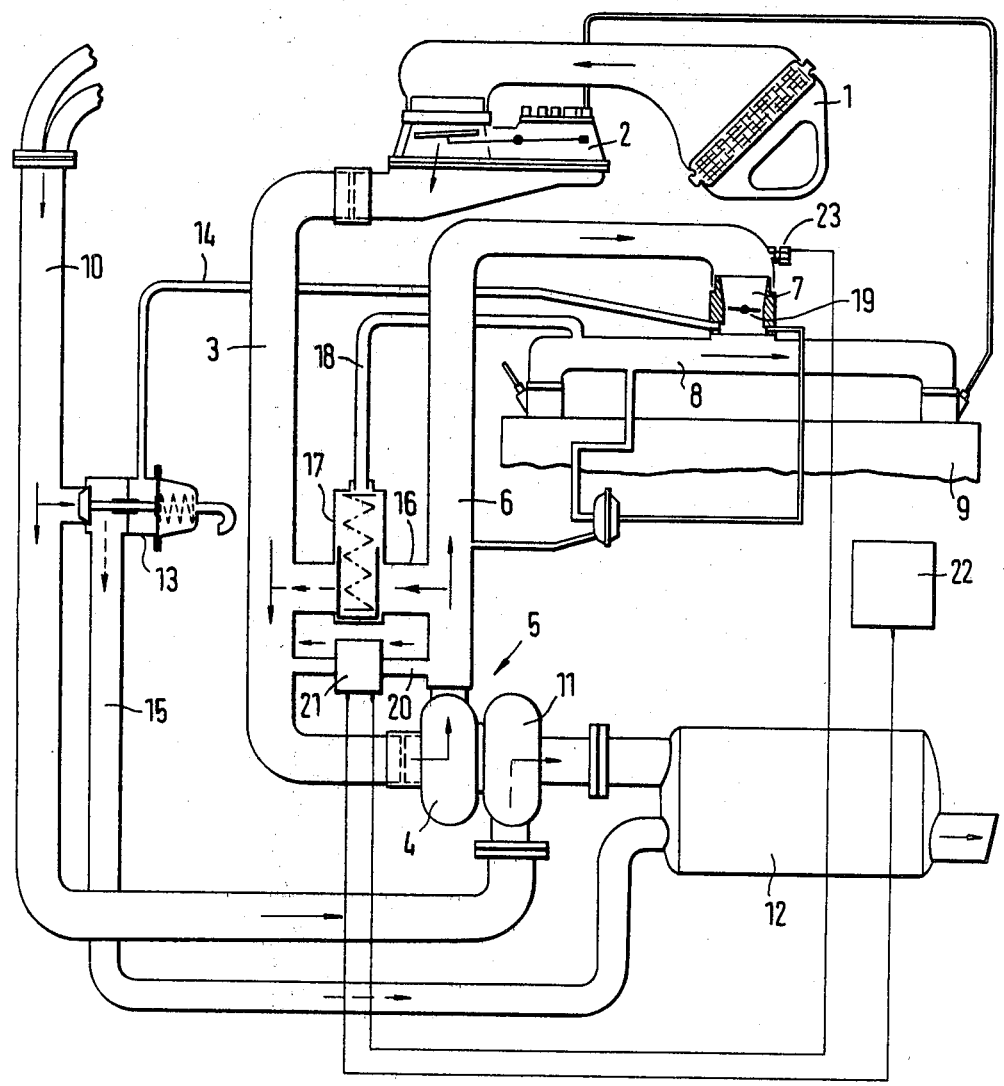

SUPERCHARGED INTERNAL COMBUSTION ENGINE FOR MOTOR VEHICLES

BACKGROUND AND SUMMARY OF THE INVENTION

The invention relates to a supercharged internal combustion engine for motor vehicles, comprising an exhaust gas turbosupercharger consisting of an exhaust gas turbine and a charging blower driven thereby; a charge pressure control valve arranged in the exhaust manifold of the internal combustion engine, responsive to the charge pressure of the charging blower, and regulating an exhaust gas bypass line bypassing the exhaust gas turbine; and optionally actuated performance control member regulating the passage cross section of the charging air line downstream of the charging blower; and a charging blower-coupled bypass line connecting the intake line of the charging blower to the charging air line, and opening upstream of the performance control member in the charging air line, said bypass line containing a blow-off valve actuated in response to the position of the performance control member in such a way that said blow-off valve is closed in all positions of the performance control member for which the passage is open.

A supercharged internal combustion engine comprising a charge pressure control valve mounted in the exhaust gas line of the engine, responsive to the charging blower charge pressure, and regulating an exhaust gas bypass line bypassing the exhaust gas turbine is known from German application (Offenlegungsschrift) No. 1,426,076. When a predetermined charge pressure is reached the charge pressure control valve opens the exhaust gas bypass line, and a fraction of the exhaust gases is blown off through the exhaust gas bypass line into the atmosphere, bypassing the exhaust gas turbine. No special safety means avoiding the development of excessive pressure when the charge pressure control valve is defective is provided in this supercharged internal combustion engine. A similar arrangement is shown in U.S. Pat. No. 4,202,176. The engine of this patent also has a bypass line interconnecting intake and charging air lines that is controlled by a blow-off (bleeder) valve for circulating the fresh air stream around the supercharging blower when the engine throttle valve is closed.

To limit the rpm of supercharged or nonsupercharged internal combustion engines, it is known to disconnect the ignition (German application—Offenlegungsschrift—No. 2,406,814). If a catalyst is used in such an engine to improve the exhaust gas emission, the catalyst is automatically destroyed by the unburnt fuel when the rpm is limited by turning off the ignition.

To limit the rpm of a supercharged or nonsupercharged internal combustion engine, it is known also to interrupt the fuel supply to the engine by stopping the fuel pump. But in this case, it has been found disadvantageous that the vehicle is braked abruptly on rpm limitation by interruption of the fuel supply, which is not very pleasant for the occupants of the vehicle, and may also be dangerous in some cases.

Thus, a principal object of the present invention is to provide a supercharged internal combustion engine with an exhaust gas turbosupercharger whose operation is optimized.

According to a perferred embodiment of the invention, this object is achieved by providing an engine as described in U.S. Pat. No. 4,202,176, with an additional bypass line coupled to the charging blower that connects the charging blower to the charging air line, and opens upstream of a performance control member (throttle) in the charging air line. The passage cross section of the bypass line and is controlled by at least one operating parameter of the internal combustion engine. An rpm tranducer and/or an electric charge pressure safety switch that is responsive to the charge pressure has been found especially suitable for use as the controlling operating parameter. The rpm transducer may be an ignition pulse transducer.

When an rpm transducer is used, the bypass line is opened by the solenoid valve as a predetermined rpm is reached, so that a fraction of the fresh air stream is deflected around the charging blower. When used, the catalyst is not damaged in this phase of the operation of the engine. The engine rpm drops in response to the dropping charge pressure, and the vehicle is not abruptly braked.

When a charge pressure safety switch set up to respond to a charge pressure slightly higher than that actuating the charge pressure control valve is used, the bypass line is opened by the solenoid valve when the charge pressure control valve fails and does not open when a predetermined charge pressure is exceeded. Consequently, a fraction of the fresh air stream is deflected around the charging blower, and the charge pressure cannot continue to increase.

When both an rpm transducer and a charge pressure safety switch are used in an internal combustion engine, the application of a solenoid valve according to the invention provides for an engine comprising both an excessive rpm protection means and a safety means for protection from excessive charge pressure. The above cited disadvantages are eliminated with these means.

These and further objects, features and advantages of the present invention will become more obvious from the following description when taken in connection with the accompanying drawings which show, for purposes of illustration only, a single embodiment in accordance with the present invention.

BRIEF DESCRIPTION OF THE DRAWINGS

The sole FIGURE illustrates one embodiment of the invention with an rpm transducer and a charge pressure safety switch represented schematically.

DETAILED DESCRIPTION OF THE PREFERRED EMBODIMENT

In an internal combustion engine provided with a known exhaust gas turbosupercharger, fresh air is taken in through an air filter 1, a mixture regulator 2, and an intake line 3 from which it is directed through an exhaust gas turbosupercharger 5, a charging air line 6, and a choke housing 7 to an air distributor 8, and therefore to the engine 9. The exhaust gas flow of engine 9 is guided to the atmosphere through an exhaust manifold 10, the exhaust gas turbine 11 of the exhaust gas turbosupercharger, and a muffler 12. Exhaust gas turbine 11 is driven by the exhaust gas flow and drives a charging blower 4 which supplies the fresh air under pressure to engine 9.

A charge pressure control valve 13 mounted in exhaust manifold 10 regulates the charge pressure of charging blower 4 by a control line 14 so that charge pressure control valve 13 is opened by the charge excess pressure, and the exhaust gas flows through an exhaust gas bypass line 15 directly to muffler 12, bypassing exhaust gas turbine 11. To maintain the charging blower rpm, for example when pushing or to obtain a rapid response of engine 9 on acceleration, a bypass line 16 with a blow-off valve 17 is arranged between intake line 3 and charging air line 6. Blow-off valve 17 is actuated by another control line 18 by which said valve 17 is opened by vacuum when choke 19 is closed, so that a fresh air stream is deflected around charging blower 4 to maintain the rpm thereof. Another bypass line 20 connects intake line 3 to pressure line 6 and contains a solenoid valve 21. Valve 21 is actuated by an rpm transducer 22, for example, an ignition pulse transducer and a charge pressure safety switch 23 which responds to a charge pressure slightly higher than that actuating the charge pressure control valve 13.

The operation of the invention is as follows:

After the internal combustion engine has been started exhaust gas turbine 11, and therefore charging blower 4, are driven by the exhaust gases. Due to the still relatively low charge pressure, charging pressure control valve 13 is closed, and all the exhaust gases are directed to exhaust gas turbine 11 through exhaust manifold 10. When the choke 19 of engine 9 is opened wider, the charge pressure of charging blower 4 rises. When said pressure reaches a pre-determined value, charge pressure control valve 13 opens and a fraction of the exhaust gases is released directly into the atmosphere through exhaust gas bypass line 15 and muffler 12, bypassing exhaust gas turbine 11. If charge pressure control valve 13 is defective and does not open in response to a predetermined charge pressure which is still rising slightly, solenoid valve 21 is opened by charge pressure safety switch 23. A fraction of the fresh air stream is deflected again around charging blower 4 through bypass line 20, so that a further increase in the charge pressure is avoided, or the charge pressure drops.

When the engine rpm reaches a predetermined value solenoid valve 21 is opened by rpm transducer 22. A fraction of the fresh air stream is circulated again through bypass line 20 to the charging blower, so that the charge pressure and therefore the engine rpm drop.

When the charge pressure and the engine rpm drop below the predetermined value solenoid valve 21 closes again.

I claim:

1. A supercharged internal combustion engine for motor vehicles, comprising an exhaust turbocharger including an exhaust gas turbine and a charging blower driven thereby, said charging blower receiving fresh air through an intake line and delivering same under pressure to the engine through a charging air line; a charge pressure control valve arranged in an exhaust manifold of the internal combustion engine, said charge pressure control valve being responsive to the charging blower charge pressure, and regulating an exhaust gas bypass line that bypasses the exhaust gas turbine; a selectively actuated performance control member regulating the passage cross section of the charging air line downstream of the charging blower; and a charging blower-coupled bypass line connecting the charging blower intake line to the charging air line at a location in the charging air line upstream of the performance control member, a blow-off valve means in said bypass line, means actuated in response to the position of the performance control member for closing the said blow-off valve means in all positions of the performance control member for which the passage is open; an additional bypass line coupled to the charging blower and connecting the intake line of the charging blower to the charging air line at a location in the charging air line upstream of the performance control member, said additional bypass line containing a solenoid valve means controlled by at least one of the operating parameters of the internal combustion engine for regulating the passage cross section of the additional bypass line, characterized in that the at least one operating parameter includes engine rpm and said solenoid is actuated by an rpm transducer.

2. A supercharged internal combustion engine for motor vehicles, comprising an exhaust gas turbosupercharger including an exhaust gas turbine and a charging blower driven thereby, said charging blower receiving fresh air through an intake line and delivering same under pressure to the engine through a charging air line; a charge pressure control valve arranged in an exhaust manifold of the internal combustion engine, said charge pressure control valve being responsive to the charging blower charge pressure, and regulating an exhaust gas bypass line means that bypasses the exhaust gas turbine; a selectively actuated performance control member regulating the passage cross section of the charging air line downstream of the charging blower; and a charging blower coupled bypass line connecting the charging blower intake line to the charging air line at a location in the charging air line upstream of the performance control member, a blow-off valve means in said charging blower coupled bypass line, means actuated in response to the position of the performance control member for closing said blow-off valve means in all positions of the performance control member for which the passage is open; an additional bypass line coupled to the charging blower and connecting the intake line of the charging blower to the charging air line at a location in the charging air line upstream of the performance control member, said additional bypass line containing a solenoid valve means controlled by at least one of the operating parameters of the internal combustion engine for regulating the passage cross section of the additional bypass line, the exhaust gas bypass means serving for regulating the exhaust gas turbine by directing exhaust gases around the turbine when charging pressures of air supplied from the blower are above a predetermined value, the blow-off valve means serving for controlling charging air bypass for circulating charging air supplied from the blower therearound when said engine performance control member is closed, the improvement comprising safety means for controlling the additional bypass line for circulating a portion of the air supplied by the blower therearound in response to said at least one operating parameter of the engine in a manner so as to provide protection against excess charging pressure, said solenoid means serving for controlling said second charging air bypass to open in response to said at least one operating parameter attaining a predetermined value, wherein the said at least one operating parameter includes engine rpm and said solenoid is actuated by an rpm transducer.

3. The supercharged internal combustion engine as in one of claims 1 or 2, characterized in that the rpm transducer is an ignition pulse transducer.

4. The supercharged internal combustion engine as in one of claims 1 or 2, characterized in that the at least one operating parameter includes charging air pressure and said solenoid is actuated by an electric charge pressure safety switch responsive to the charging air pressure.

5. The supercharged internal combustion engine according to claim 4, wherein
said safety switch comprises means for responding to a charge pressure slightly higher than to which said charge pressure control valve is responsive.

* * * * *